United States Patent [19]

Dobson et al.

[11] E Patent Number: Re. 32,340

[45] Reissued Date of Patent: Jan. 27, 1987

[54] ELECTRICAL SWITCH-PLUG ASSEMBLY WITH BAFFLE

[75] Inventors: William C. Dobson, West Bend, Wis.; Carl R. Spoeth, New Port Richey, Fla.

[73] Assignee: Dart Industries Inc., Northbrook, Ill.

[21] Appl. No.: 772,110

[22] Filed: Sep. 30, 1985

Related U.S. Patent Documents

Reissue of:

[64] Patent No.: 4,528,429
Issued: Jul. 9, 1985
Appl. No.: 583,631
Filed: Mar. 2, 1984

[51] Int. Cl.[4] ..... H01H 9/20; H01R 33/30

[52] U.S. Cl. ..... 200/50 B; 200/51.09; 339/40; 339/43

[58] Field of Search ..... 200/50 B, 51.09, 51.1, 200/51 R, 304; 219/247-250, 259, 518; 339/40-43

[56] References Cited

U.S. PATENT DOCUMENTS

| | | | |
|---|---|---|---|
| 891,263 | 6/1908 | Klein | 174/67 |
| 943,016 | 12/1909 | Guett | 339/41 |
| 1,111,406 | 9/1914 | Sargent | 339/43 |
| 1,271,478 | 7/1918 | Krantz | 339/43 |
| 1,579,865 | 4/1926 | Hubbell | 339/43 |
| 1,731,973 | 10/1929 | Fischer | 200 50 B X/ |
| 1,851,685 | 3/1932 | Salmon | 219/259 |
| 1,929,312 | 10/1933 | Hinds | 38/104 |
| 2,155,925 | 4/1939 | Blinn | 339/191 S X |
| 2,234,347 | 3/1941 | Lobstein | 38/82 |
| 2,528,014 | 10/1950 | Moses, Jr. et al. | 339/40 |
| 2,540,496 | 2/1951 | Sperrazza | 200/51.09 |
| 2,545,536 | 3/1951 | Von Holtz | 339/40 |
| 2,553,837 | 5/1951 | Von Holtz | 339/40 |
| 2,579,538 | 12/1951 | Bierce | 339/40 |
| 2,770,786 | 11/1956 | Czyzewski | 339/40 |
| 3,222,631 | 12/1965 | Cohen | 339/40 |
| 3,238,492 | 3/1966 | Houston | 339/40 |
| 3,398,260 | 8/1968 | Martens | 219/247 |
| 3,745,676 | 7/1973 | Dikoff | 38/96 |
| 3,760,149 | 9/1973 | Harsanyi | 219/247 |
| 3,942,856 | 3/1976 | Mindheim et al. | 200/51.09 |
| 3,990,758 | 11/1976 | Petterson | 339/43 |
| 4,072,382 | 2/1978 | Reschke | 339/40 |
| 4,158,104 | 9/1979 | Buschow | 339/40 |
| 4,379,607 | 4/1983 | Bowden, Jr. | 339/40 |
| 4,389,551 | 6/1983 | Deibele | 200/50 B X |

FOREIGN PATENT DOCUMENTS

| | | |
|---|---|---|
| 480179 | 4/1953 | Italy . |
| 520015 | 4/1940 | United Kingdom . |
| 533433 | 2/1941 | United Kingdom . |
| 812890 | 5/1959 | United Kingdom . |
| 1006827 | 10/1965 | United Kingdom . |
| 2089146 | 6/1982 | United Kingdom . |
| 2108781 | 10/1984 | United Kingdom . |

*Primary Examiner*—J. R. Scott
*Attorney, Agent, or Firm*—Gregory J. Mancuso

[57] ABSTRACT

A shielded electrical connector usable in conjunction with a household electrical appliance such as a cordless iron. The connector comprises a plug and a socket, the socket having a movable baffle which is held closed when the plug is not engaged with the socket, to isolate the socket's electrical contacts behind a shield section of the baffle. The socket also has a baffle arm, isolated from the shield section of the baffle, by which the baffle may be opened. The plug bears a projection which engages the baffle arm as the plug engages the socket. The socket also has an electrical switch which activates the socket's electrical contacts after the plug is substantially engaged with the socket.

23 Claims, 15 Drawing Figures

ELECTRICAL SWITCH-PLUG ASSEMBLY WITH BAFFLE

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to electrical connectors, and more particularly to electrical connectors having means whereby the electrical contacts are shielded to reduce the risk of electrical shock.

SUMMARY OF THE INVENTION

The electrical connector of this invention is intended to provide electrical contact between a device, such as an electric iron, and a power supply. The electrical connector allows the simple connection and disconnection of a device from a power supply, while shielding live contacts. The electrical connector is generally of the plug and socket type.

The electrical connector comprises a plug, which carries an electrically conductive contact, or plug prong. The plug prong is connected in electrical union to a device to which electrical power is to be furnished. In one aspect of this invention, the plug is carried by an electrically operated device such as an electric iron, and the plug prong comprises a pair of contacts electrically connected to the iron's heating element.

The electrical connector also comprises a socket. The socket carries an electrically conductive contact, or socket contact. The electrical connector has means for establishing electrical union between the socket contact and a power supply. The socket also has a passage, which comprises one or more apertures, which are adapted to receive at least a portion of the plug prong in an initial position out of contact with the socket contact, and in a final position in contact with the socket contact.

In one aspect of this invention, the socket comprises a support assembly for an electric device, such as an electric iron. In that aspect, the socket contact comprises a pair of contacts. When supported by the support assembly, the iron is connected to a power supply, to provide electricity to the iron's heating element to heat the iron sole plate. When removed from the support assembly, the iron is disconnected from the power supply. In this manner, a cordless electric iron or other electric device is provided.

The socket also carries a shutter or baffle, which is movable to a closed position, in which a portion of the baffle is interposed between the passage and the socket contact to block access to the socket contact by the plug prong or by other objects. In the case of a cordless electric iron, it is desirable to shield the socket contacts from the user when the iron is removed from its support, to prevent inadvertent contact with the socket contacts by the user.

The baffle is also movable to an open position, in which the socket contact is exposed to the passage to allow access to the socket contact by the plug prong. The socket carries means for movably maintaining the baffle in its closed position. In one aspect of this invention, such means comprise a spring.

When closed, the baffle is locked into place to provide substantial resistance to physical access to the socket contact. The locking feature can be accomplished by providing a baffle which opens by moving in a direction other than the direction in which the plug prong moves as it enters the passage and moves toward the socket contact. In one aspect of this invention, the baffle comprises a rotor having an axis generally transverse to the direction of travel of the plug prong toward the socket contact. The rotor has a horizontal axis on a line which passes generally between the socket contact and the passage. Force applied through the passage to the rotor in the direction of travel of the plug prong as the plug prong moves toward the socket contact will not cause the rotor to rotate to an open position. In that aspect, the rotor has cut-outs such that in one rotational position access to the socket contact is blocked, and in another rotational position access to the socket contact is provided. In another aspect of this invention, the baffle comprises a slide or rotor which moves between the passage and the socket contact in a plane generally transverse to the line of travel of the plug as it travels through the passage to the socket contact.

The baffle is provided with a baffle control arm. The baffle control arm is adapted to move from a first position to a second position, cooperating with the baffle to move the baffle from its closed position to its open position. The plug carries a projection which is adapted to engage a surface of the baffle control arm as the plug prong is moved toward the socket contacts. As the plug prongs are moved toward the socket contacts, the plug projection engages the baffle control arm. As the plug prongs continue to move toward the socket contacts, the plug projection moves the baffle control arm, thereby moving the baffle to its open position. When the baffle is in its open position, the socket contact is exposed to the plug prong. The plug prong can then continue to be moved toward the socket contact, to engage the socket contact, establishing an electrical connection between the plug prong and the socket contact.

Because the baffle is opened by moving the baffle control arm, thus exposing the socket contact, it is necessary to provide a means to minimize the risk of inadvertent contact with the socket contact when the baffle is in its open position. In the preferred electrical connector of this invention, the engagement surface of the baffle control arm is separate from the surface of the baffle exposed to the passage when the baffle is in its closed position. The engagement surface is also isolated from the socket contact. An object inserted into the socket to engage the baffle control arm and open the baffle is separated from the socket contact by a separating means. In one aspect of this invention, the means comprises a wall between the engagement surface and the socket contact. In another aspect of this invention, the means comprises an opening in the socket distinct from the passage, proximate the baffle control arm.

The plug can be disengaged from the socket in a reverse manner. As the plug prong is moved away from the socket contact, the projection is disengaged from the baffle control arm. The baffle is moved to its normal closed position by means such as a coil spring.

In the aspect of this invention comprising a cordless electric iron, an iron support is provided in which the socket contacts are shielded when the iron is disengaged from the support.

In an additional aspect of this invention, the socket carries a switch connected between the power supply and the socket contacts. The switch is normally in the open position, in which the socket contacts are electrically isolated from the power supply. The plug is adapted to close the switch as the plug prong is moved toward the socket contact. One feature of this aspect comprises a switch control which is engaged by a leg carried by the plug. In a further aspect of this invention, the plug is adapted to close the switch after the plug prong is engaged with the socket contact, to minimize electrical sparking between the plug prong and the socket contact.

Other features, aspects, and embodiments of this invention will be apparent from the following detailed description.

DETAILED DESCRIPTION OF THE PREFERRED EMBODIMENT

Figure 1:
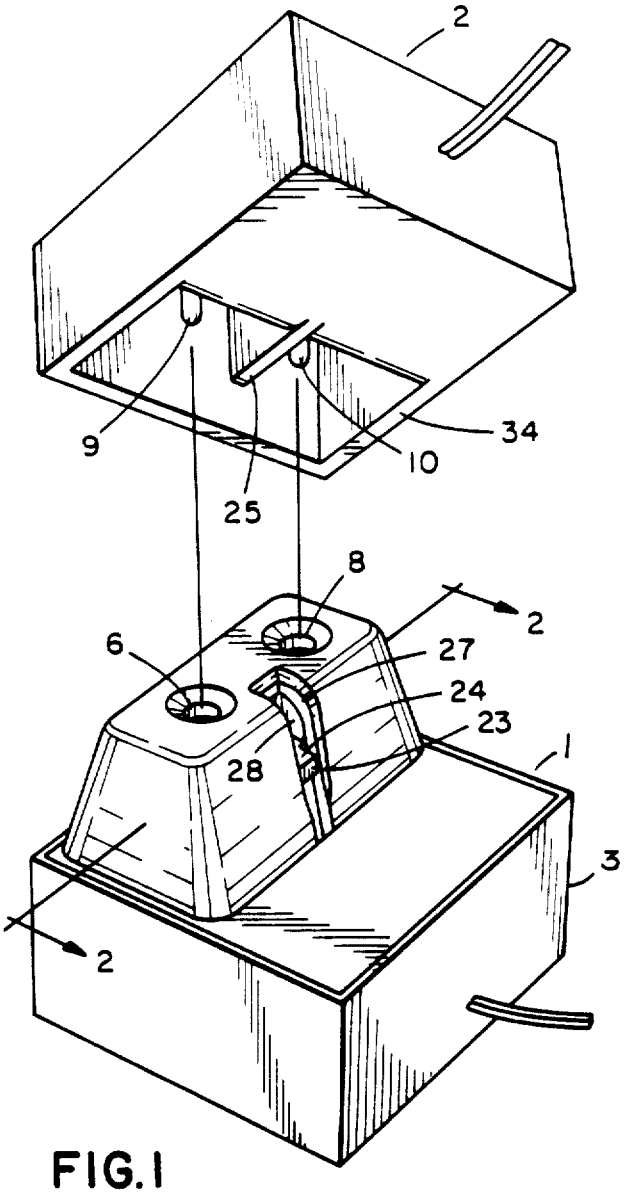
FIG. 1 is a rear perspective view of one embodiment of the plug and socket assembly of this invention, with the plug and socket disengaged and the baffle closed.

In the embodiment of the invention shown in FIGS. 1 through 10, the electrical connector of this invention comprises a socket 1 and a plug 2. The socket 1 comprises a housing 3, an electrical socket contact 4, means for establishing electrical union between socket contact 4 and a power supply, and a baffle 5. Socket contact 4 is mounted in the housing adjacent to passage 6, an aperture through which socket contact 4 can be reached.

FIGS. 1 through 10 show an embodiment preferred for use in connection with dual wire electrical leads, such as commonly used to transmit alternating current to electrical devices. In that embodiment, a second socket contact 7 is provided, along with a corresponding second aperture 8. The pair of apertures 6, 8 are located such that they can receive corresponding electrically conductive plug prongs 9, 10 carried by the plug 2 in a position of engagement with socket contacts 4, 7. In the preferred embodiment, socket contacts 4, 7 comprise contact surfaces 15, 16 and contact supports 17, 18. The contact supports 17, 18 comprise flexible members such as brass springs, to allow movement of contact surfaces 15, 16.

Socket contacts 4, 7 are shielded from access through apertures 6, 8 by a baffle 5. Baffle 5 is normally in a closed position, in which socket contacts 4, 7 are not exposed to apertures 6, 8. Baffle 5 is movable to an open position, in which socket contacts 4, 7 are exposed to apertures 6, 8. The purpose of baffle 5 is to prevent inadvertent contact with socket contacts 4, 7.

In a preferred embodiment of the electrical connector of this invention, means are provided to prevent inadvertent movement of baffle 5 to its open position. If a foreign object, such as a knife or screw driver, is used to probe apertures 6, 8 when plug 2 is disengaged, socket 1 should resist access to the socket contacts 4, 7. Socket 1 incorporates means to prevent movement of baffle 5 to the open position by force applied through one or both apertures 6, 8, and to allow movement of baffle 5 to the open position by force applied at some point other than a point on baffle 5 exposed to apertures 6, 8 when baffle 5 is in the closed position.

In the preferred embodiment of this invention, baffle 5 comprises a generally cylindrical rotor which can be rotated to an open position, allowing access to socket contacts 4, 7. Baffle 5 is rotatably supported at its ends 11, 12 by housing 3. Baffle 5 is biased to a closed position, in which baffle surfaces 21, 22 are interposed intermediate socket contacts 4, 7 and apertures 6, 8, serving as a shield to block access to socket contacts 4, 7. Baffle 5 is also movable to an open position in which baffle surfaces 21, 22 are offset out of alignment between apertures 6, 8 and socket contacts 4, 7 so that socket contacts 4, 7 are exposed to apertures 6, 8. Baffle 5 is biased to the closed position by a biasing element such as spring 20.

Figure 2:
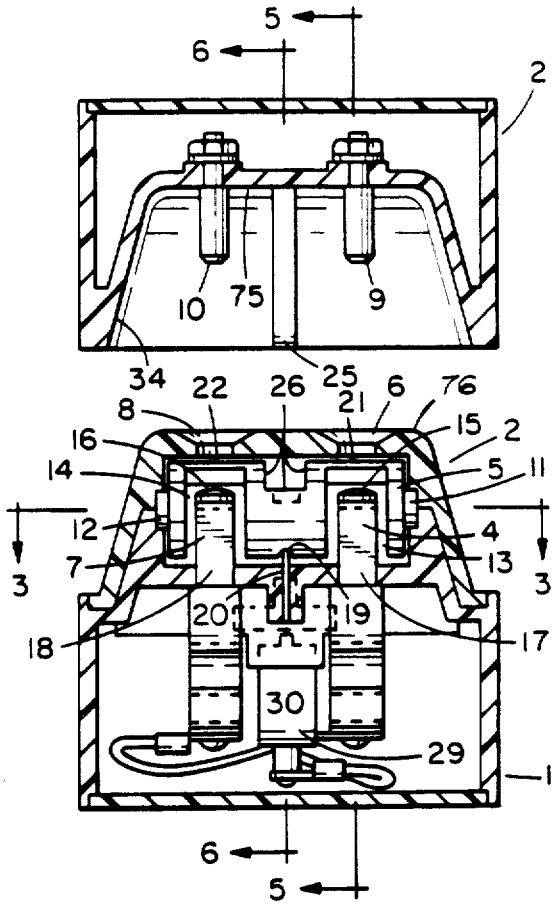
FIG. 2 is a front cross-section view of the embodiment shown in FIG. 1, taken along plane 2—2.
Figure 4:
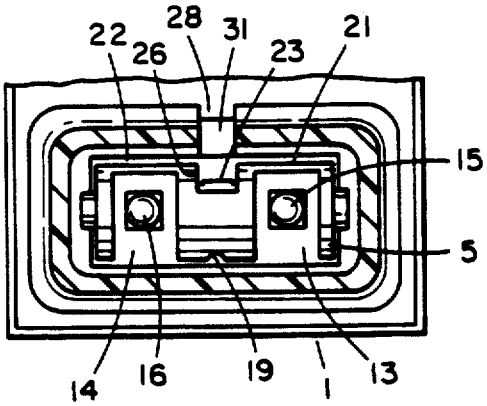
FIG. 4 is a top partial view of the socket shown in FIG. 3, with the baffle rotated to an open position.
Figure 3:
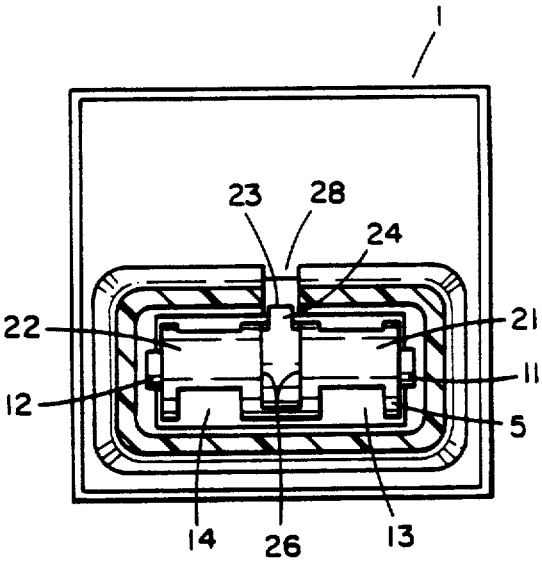
FIG. 3 is a top partial section view of the socket shown in FIG. 1, showing the baffle unsectioned in its closed position.
Figure 5:
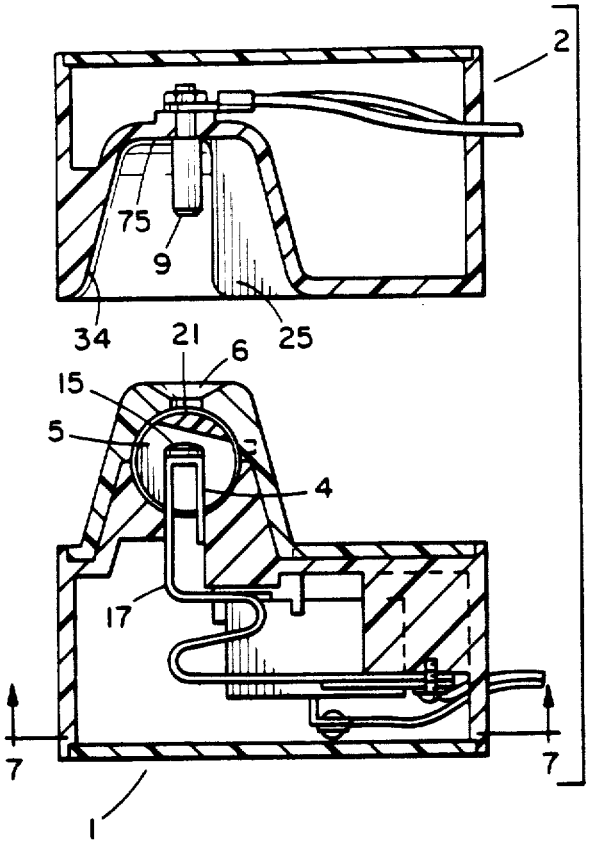
FIG. 5 is a side cross-section view of the device shown in FIG. 2, taken along plane 5—5.

When in a closed position, baffle surfaces 21, 22 form a shield which is exposed to apertures 6, 8, as best shown in FIGS. 2 and 3. Baffle 5 is located such that baffle 5 will tend to resist rotation to an open position by a force applied to surfaces 21, 22 through one or both apertures 6, 8. To accomplish such resistance, baffle 5 is located such that substantially all of the motion of baffle 5 adjacent to apertures 6, 8 is in a direction substantially different than the direction of travel of plug prongs 9, 10 as they pass through apertures 6, 8 toward socket contacts 4, 7. In a preferred embodiment, the direction of motion of baffle 5 proximate apertures 6, 8 is in a direction at an angle of greater than about 45 degrees from the direction of travel of plug prongs 9, 10 through apertures 6, 8. In the most preferred embodiment, the direction of travel of baffle 5 proximate apertures 6, 8 is generally transverse to the direction of travel of plug prongs 9, 10 through the apertures 6, 8.

To provide the desired direction of travel in a rotating baffle, baffle 5 is preferably located with its axis generally transverse of the direction of travel of plug prongs 9, 10 as they travel through apertures 6, 8 toward socket contacts 4, 7. Preferably, the axis of baffle 5 is in a plane passing generally through apertures 6, 8 and socket contacts 4, 7. With the axis of baffle 5 in such a position, a line of force exerted on baffle 5 through apertures 6, 8 will tend to intersect the axis of baffle 5, and will be resisted by housing 3 supporting ends 11, 12 of baffle.

Figure 6:
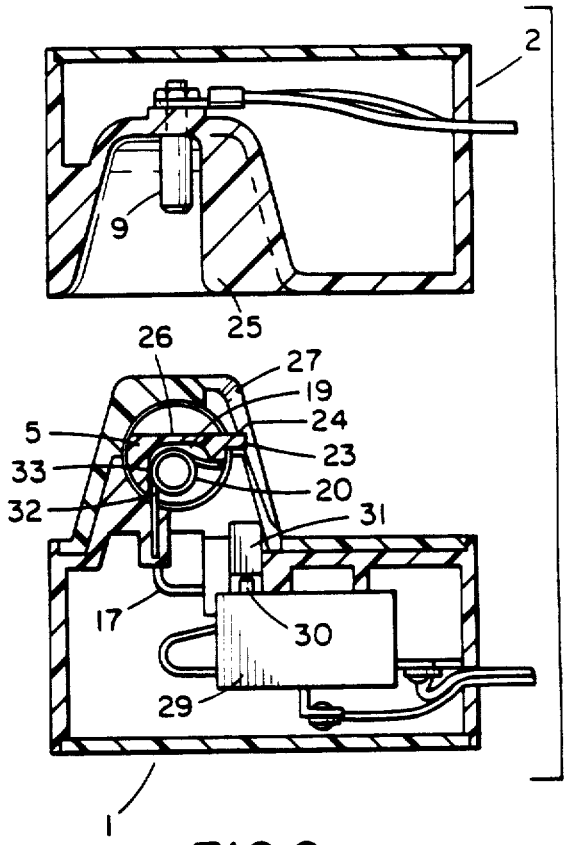
FIG. 6 is a side cross-section view of the device shown in FIG. 2, taken along plane 6—6.
Figure 7:
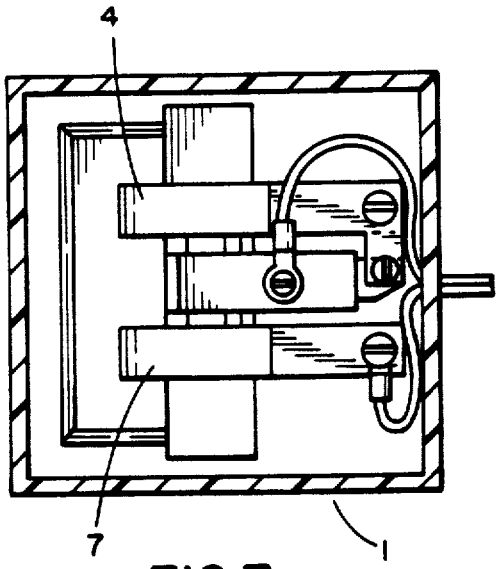
FIG. 7 is a bottom section view of the device shown in FIG. 5, taken along plane 7—7.
Figure 8:
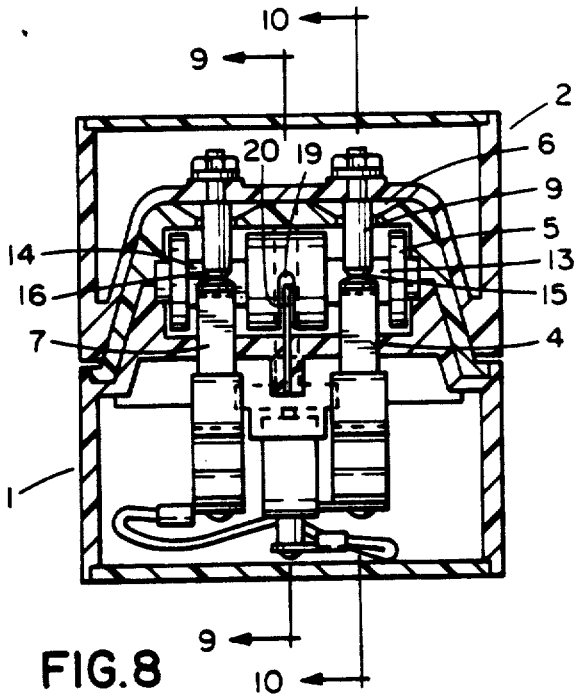
FIG. 8 is a front cross-section view of the device shown in FIG. 2, in its engaged position, with the baffle open.
Figure 9:
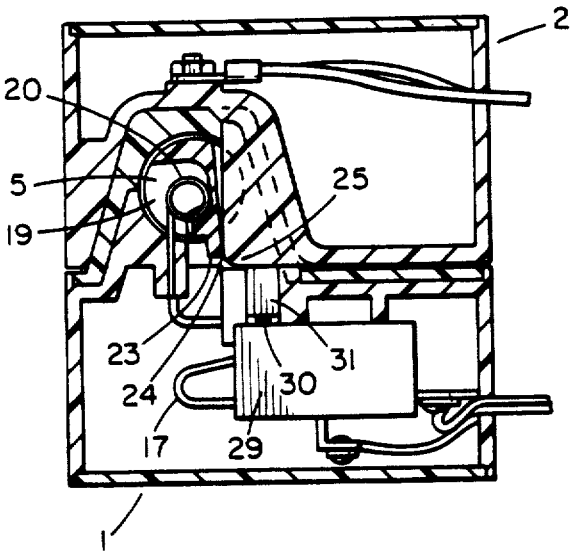
FIG. 9 is a side cross-section view of the device shown in FIG. 8, taken along plane 9—9.
Figure 10:
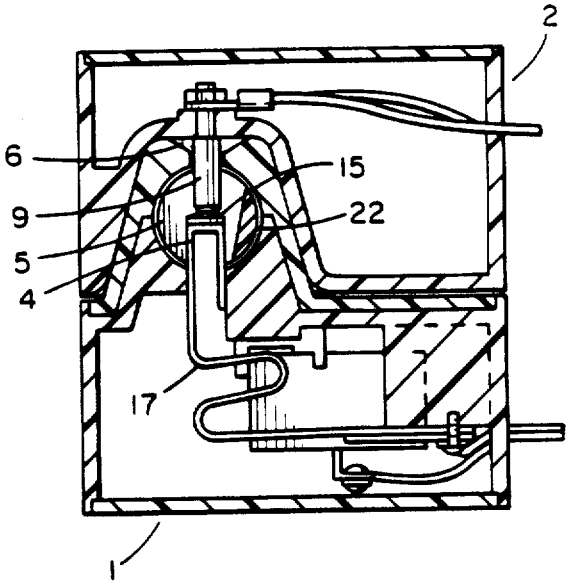
FIG. 10 is a side cross-section view of the device shown in FIG. 8, taken along plane 10—10.

Baffle 5 is provided with cut-outs 13, 14 which accommodate contact surfaces 15, 16 and portions of socket contacts 4, 7 adjacent thereto when baffle 5 is in a closed position. Cut-outs 13, 14 receive plug prongs 9, 10 when baffle 5 is in its open position exposing socket contacts 4, 7. Baffle 5 is also provided with a cut-out 19 which accommodates a portion of a spring 20, preferably a coil spring. Spring 20 biases baffle 5 in a closed position. Spring 20 also limits movement of baffle 5 in a counter-clockwise direction as shown in FIG. 6. Spring arm 32 engages cut-out wall 33 as baffle 5 is moved in a counter-clockwise direction, biasing baffle 5 in a closed position.

A baffle control arm 23 is provided, which cooperates with baffle 5 to allow baffle 5 to be moved from its closed position to its open position. Baffle control arm 23 has an engagement surfaces 24, to which force can be applied to move baffle 5 to its open position. Engagement surface 24 is separate from baffle surfaces 21, 22, offset in such a manner that engagement surface 24 is not readily engageable through apertures 6, 8. Baffle 5 will resist opening if force is applied through apertures 6, 8 to baffle surface 21, 22 but will readily open if force is applied to engagement surface 24.

In the preferred embodiment of this invention, baffle control arm 23 is an integral part of baffle 5, and comprises a lever which projects axially from baffle 5 to provide engagement surface 24 removed from baffle surfaces 21, 22. Baffle control arm 23 extends radially a sufficiently great distance to provide an acceptable engagement surface 24, and to provide a sufficiently long moment arm so that the force required to rotate baffle 5 is within acceptable limits.

Plug 2 carries a projection 25 which is adapted to engage baffle control arm 23 when plug prongs 9, 10 are aligned with socket contacts 4, 7. As plug prongs 9, 10 are moved toward socket contacts 4, 7, in alignment with apertures 6, 8 projection 25 engages engagement surface 24 of baffle control arm 23. As plug prongs 9, 10 continue to move toward engagement with socket contacts 4, 7, projection 25 maintains engagement with baffle control arm 23 and moves baffle control arm 23 from its first position, corresponding to the closed position of baffle 5, to its second position, corresponding to the open position of baffle 5. Baffle control arm operates on baffle 5 by translating the generally linear motion of projection 25 to rotational motion to move baffle 5 from its closed position to its open position.

As plug 2 is moved toward socket 1, with plug prongs 9, 10 in alignment with apertures 6, 8, projection 25 may engage baffle control arm 23 either before or after plug prongs 9, 10 are received by apertures 6, 8, depending on the relative lengths of projection 25 and plug prongs 9, 10. It is preferred that baffle 5 remain closed until plug prongs 9, 10 are immediately adjacent to baffle 5. It is also preferred that plug prongs 9, 10 not engage baffle 5, since engagement would tend to retard the movement of baffle 5. In the preferred embodiment shown in FIGS. 1-12, baffle control arm 23 is a lever arm projecting radially from baffle 5. The distance between baffle 5 and plug prongs 9, 10 in their position when projection 25 is in initial engagement with baffle control arm 23 in its first position must be at least as great as the distance projection 25 must travel to move baffle control arm 23 from its first position to its second position. In the preferred embodiment, baffle 5 is located immediately adjacent apertures 6, 8. As plug 2 is moved toward engagement with socket 1, projection 25 engages baffle control arm 23 before plug prongs 9, 10 are received by apertures 6, 8.

In this manner, a plug and socket arrangement is provided in which socket contacts 4, 7 are shielded by baffle 5, and in which plug 2 cooperates with socket 1 to move baffle 5 to an open position as plug contacts 9, 10 are moved toward socket contacts 4, 7 for electrical engagement.

Means are provided to prevent movement of a foreign object from engagement with baffle control arm 23 into engagement with socket contacts 4, 7. In a preferred embodiment of the electrical connector of this invention, baffle control arm 23 is physically separated from socket contacts 4, 7 by a wall supported by socket 1. In the most preferred embodiment, the separating means comprises a baffle wall 26 adjacent to baffle control arm 23, formed by three sides of a cut-out in baffle 5 opposite socket cut-outs 13, 14. An object engaging engagement surface 24 of baffle control arm 23 is prevented from moving to socket contacts 4, 7 by baffle wall 26. Baffle wall 26 physically separates baffle engagement surface 24 and socket contacts 4, 7 in all positions of baffle 5 between its closed position and its open position. If the foreign object is removed from baffle control arm 23, biasing means 20 moves baffle 5 to its closed position.

In the preferred embodiment of the electrical connector of this invention, the separating means also comprises housing wall 27, which defines an opening 28 through which baffle control arm 23 is accessable. To minimize inadvertent contact with baffle control arm 23, it is recessed within opening 28. In the preferred embodiment, opening 28 is formed in the shape of a slot adapted to receive plug projection 25. As plug 2 is directed to socket 1, projection 25 is received by opening 28. When plug 2 is fully engaged with socket 1, and plug prongs 9, 10 are in their final position electrically engaged with socket contacts 4, 7, at least a portion of plug projection 25 resides within opening 28. A foreign object inserted into opening 28 in engagement with engagement surface 24 is blocked from contact with socket contacts 4, 7 by housing wall 27. Movement of the object from opening 28 to one of the apertures 6, 8 disengages the object from baffle control arm 23. When the object is disengaged from baffle control arm 23, spring 20 moves baffle 5 into its closed position.

The preferred embodiment of this invention contains an additional means to prevent inadvertent contact with live electrical contacts. Such means comprises a switch 29 connected between a power supply and one of the socket contacts 4, 7. When the plug 2 and socket 1 are disengaged, switch 29 is in the "off" position, and socket contacts 4, 7 are electrically dead. When plug 2 and socket 1 are fully engaged, so that plug prongs 9, 10 are engaged with socket contacts 4, 7, switch 29 is in the "on" position, and socket contacts 4, 7 are electrically live. Switch 29 isolates socket contacts 4, 7 from electrical power until socket contacts 4, 7 are isolated from inadvertent contact by engagement of plug 2 and socket 1.

Switch 29 is activated by button 30, which is depressed to close switch 29. Plug 2 has means for depressing button 30 to close switch 29 as plug 2 is engaged with socket 1. In the preferred embodiment, such means comprises projection 25. As plug 2 and socket 1 are engaged, plug projection 25 engages slide 31. Slide 31 is thereby moved to depress button 30, closing switch 29. In the preferred embodiment, switch 29 is closed only after plug prongs 9, 10 have engaged socket contacts 4, 7, to eliminate electrical sparking between plug prongs 9, 10 and socket contacts 4, 7. To allow the necessary movement of plug 2 toward switch 29 to close switch 29 after socket contacts 4, 7 have been engaged, socket contacts 4, 7 include yieldable contact supports 17, 18 preferably comprising flexible leaf springs.

The preferred embodiment of the electrical connector of this invention includes a further means to prevent accidental contact with live electrical contacts. Plug 2 and socket 1 are adapted to interfit in such a manner that socket contacts 4, 7 are hidden from user access when baffle 5 is open. Plug prongs 9, 10 are carried by a wall 75 surrounded by skirt 34. Wall 75 and skirt 34 define a recess into which plug prongs 9, 10 extend. Socket 1 has a raised portion 76, the external dimensions of which generally correspond to the internal dimensions of the recess. Plug prongs 9, 10 and apertures 6, 8 are located such that plug 2 and socket 1 can be mated. As plug 2 and socket 1 are mated, projection 25 open baffle 5 only after skirt 34 shields apertures 6, 8 from external access.

In the preferred embodiment of this invention, the sequence of events as plug 2 is moved toward socket 1 is as follows: Plug 2 and socket 1 are generally aligned. As plug 2 is moved toward socket 1, the recess formed by skirt 34 and wall 75 on plug 2 receives raised portion 76 of socket 1, orienting plug prongs 9, 10 into alignment with apertures 6, 8 and also orienting projection 25 into alignment with opening 28. Opening 28 receives projection 25, to further align plug prongs 9, 10 with apertures 6, 8. As plug 2 is moved into further engagement with socket 1, skirt 34 conceals apertures 6, 8 and projection 25 engages baffle control arm engagement surface 24. As plug 2 continues to be moved into further engagement with socket 1, projection 25 depresses baffle control arm 23, moving it from its first position, causing baffle 5 to move. As plug 2 is moved into further engagement with socket 1, projection 25 continues to move baffle control arm 23 toward its second position, moving baffle surfaces 21, 22 out of interposition between plug prongs 9, 10 and socket contacts 4, 7. As plug 2 is moved into further engagement with socket 1, plug prongs, 9, 10 move into the volume previously concealed by baffle surfaces 21, 22, and engage contact surfaces 15, 16 on socket contacts 4, 7. As plug 2 continues to move toward complete engagement, plug prongs 9, 10 move contact surfaces 15, 16, and projection 25 engages button 30 through slide 31, closing switch 29 and providing electrical power through socket contacts 4, 7 to plug projections 9, 10.

Figure 11:
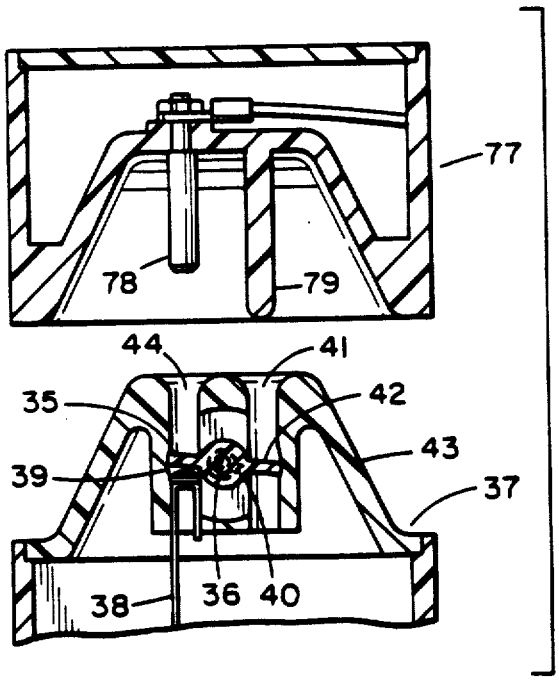
FIG. 11 is a side cross-section view of another embodiment of this invention.

A side cross-section of a section embodiment of a socket of this invention is shown in FIG. 11. In that embodiment, baffle 35 comprises a paddle or door, pivoted on an axis 36 generally transverse to the direction of travel of plug 77 as it engages socket 37. Baffle 35 is prevented from rotating in a counter-clockwise direction, toward socket contact 38, by stop 39. Baffle 35 is biased against stop 39 by an axial spring 40. Baffle 35 is rotatable in a clockwise direction by force exerted through opening 41 against baffle control arm 42. The electrical connector of this second embodiment operates in substantially the same manner as described above with respect to the first embodiment. As plug 77 is directed toward socket 37, plug 77 is aligned by housing 43 to orient plug prong 78 toward aperture 44, and plug projection 79 through opening 41 toward baffle control arm 42. As plug 77 is moved into engagement with socket 37, plug projection 79 engages baffle control arm 42 and moves baffle 35 toward plug prong 78 out of alignment between plug prong 78 and socket contact 38. As in the previous embodiment, it is preferred that a switch be provided which energizes socket contact 38 after plug prong 78 is engaged with socket contact 38.

Figure 12:
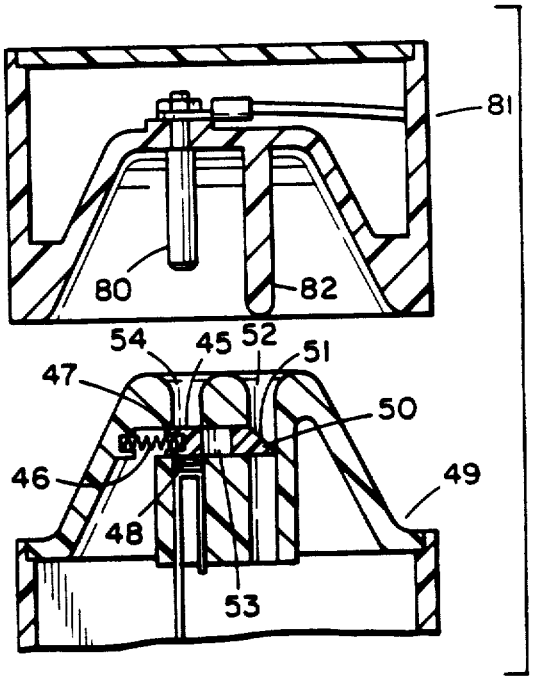
FIG. 12 is a side cross-section view of yet another embodiment of this invention.

A third embodiment of the socket of this invention is shown in side cross-section in FIG. 12. In this embodiment, baffle 45 is slidable rather than rotatable. Baffle 45 is biased by spring 46 in a closed position, in which baffle surface 47 conceals socket contact 48. Socket 49 is provided with a baffle control arm 50, in engagement with baffle 45. Baffle control arm 50 has an engagement surface 51 which is oriented at an angle with respect to the direction of opening 52 and the direction of movement of plug prong 80. As plug 81 is engaged with socket 49, plug projection 82 enters opening 52 and engages engagement surface 51, moving baffle control arm 50, and thus baffle 45, to the left. When baffle 45 is moved to the left, baffle surface 47 is removed from interposition between plug prong 80 and socket contact 48, and orifice 53 is moved into alignment with aperture 54, allowing plug prong 80 to pass through orifice 53 and into engagement with socket contact 48. As in the previously described embodiments, it is preferred to provide a switch which prevents socket contact 48 from being electrically active until plug prong 80 is in engagement with socket contact 48.

As is evident from the above disclosure, other embodiments fall within the scope of the claims of this invention. For example, the socket may incorporate a baffle which rotates about an axis generally parallel to the direction of travel of the plug prongs. In a preferred embodiment of such a socket, the baffle is generally planar and moves in a direction generally transverse of the direction of the plug prongs. In side view, the plug and socket assembly appears similar to that shown in FIG. 12. Instead of sliding along a generally straight transverse line, the baffle movement in this embodiment describes a transverse arc.

In another embodiment, a single passage is provided through which a pair of socket contacts is accessible. In another embodiment, the baffle control arm and the baffle are separate elements, rather than integral.

In another embodiment, the direction of travel of the plug prong toward the socket contact is substantially different than the direction of travel of the plug prong from the point of engagement with the socket contact to the point at which the switch is closed to provide electrical power to the socket contact. In this embodiment, the plug prong is aligned with the passage, is moved into the passage in a generally straight line to engage the socket contact, and then is rotated in engagement with the socket contact to energize the socket contact. In cross-section, the embodiment resembles FIGS. 1–12, except that the means for engaging the switch requires a force directed transverse to the direction of travel of the plug prong as it engages the socket contact. The switch is provided with a button on its side, rather than on its top as shown in FIG. 6, which is engaged by the projection as the plug is rotated in the socket.

Figure 13:
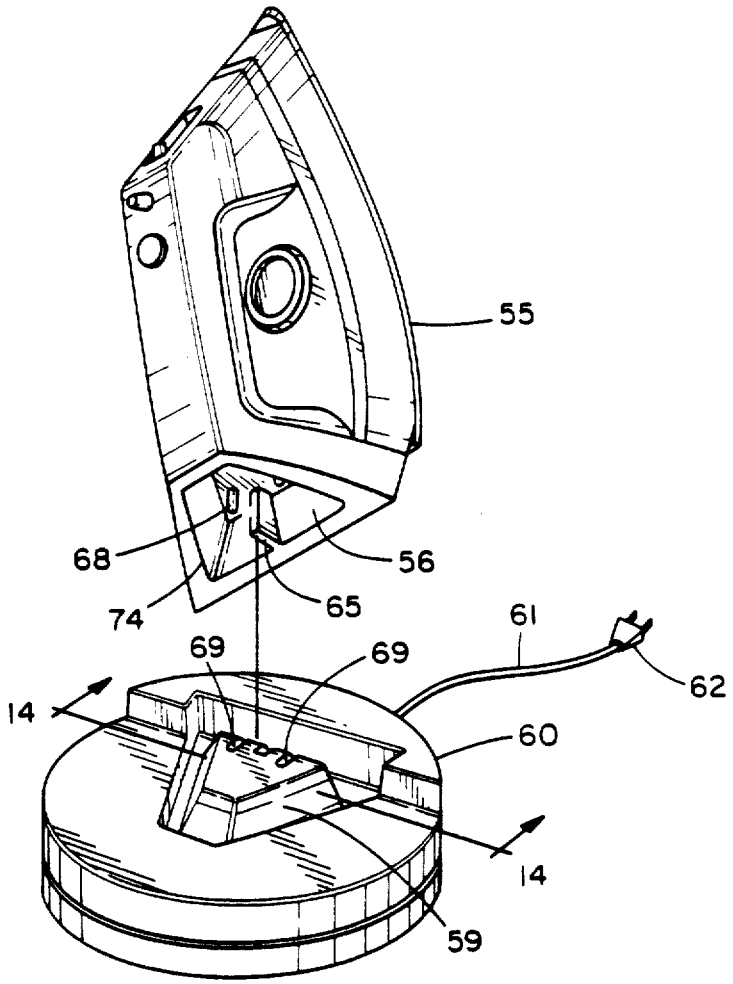
FIG. 13 is a front perspective view of a cordless iron and support, incorporating the electrical connector of this invention.
Figure 14:
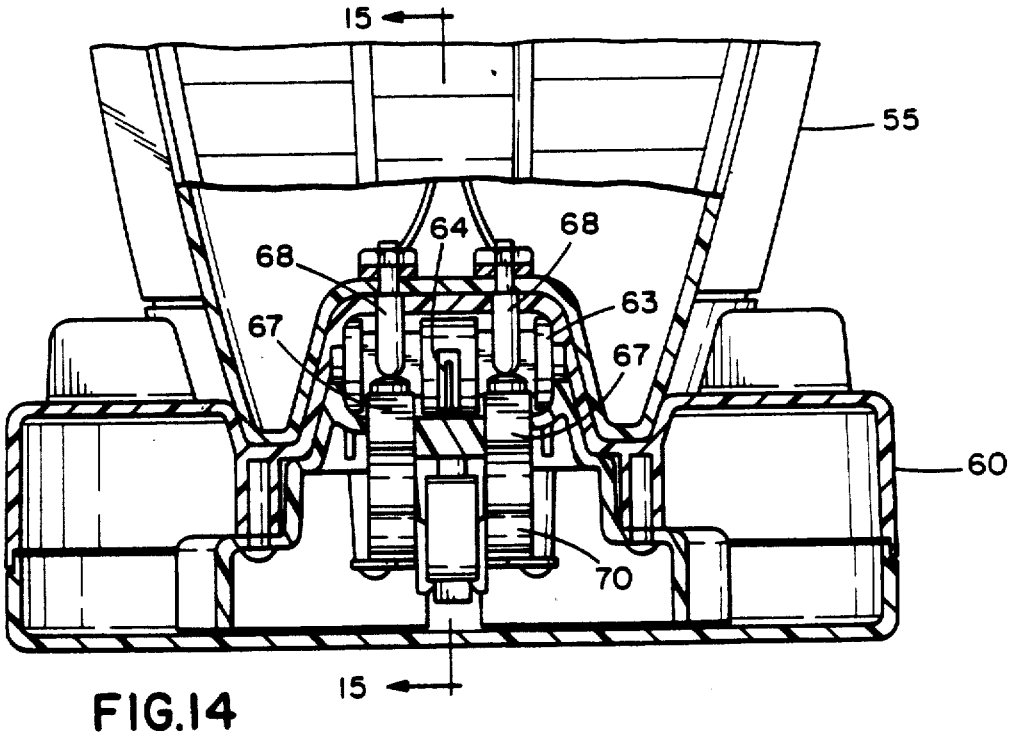
FIG. 14 is a partial front cross-section view of the iron and base of FIG. 13, in an engaged position.
Figure 15:
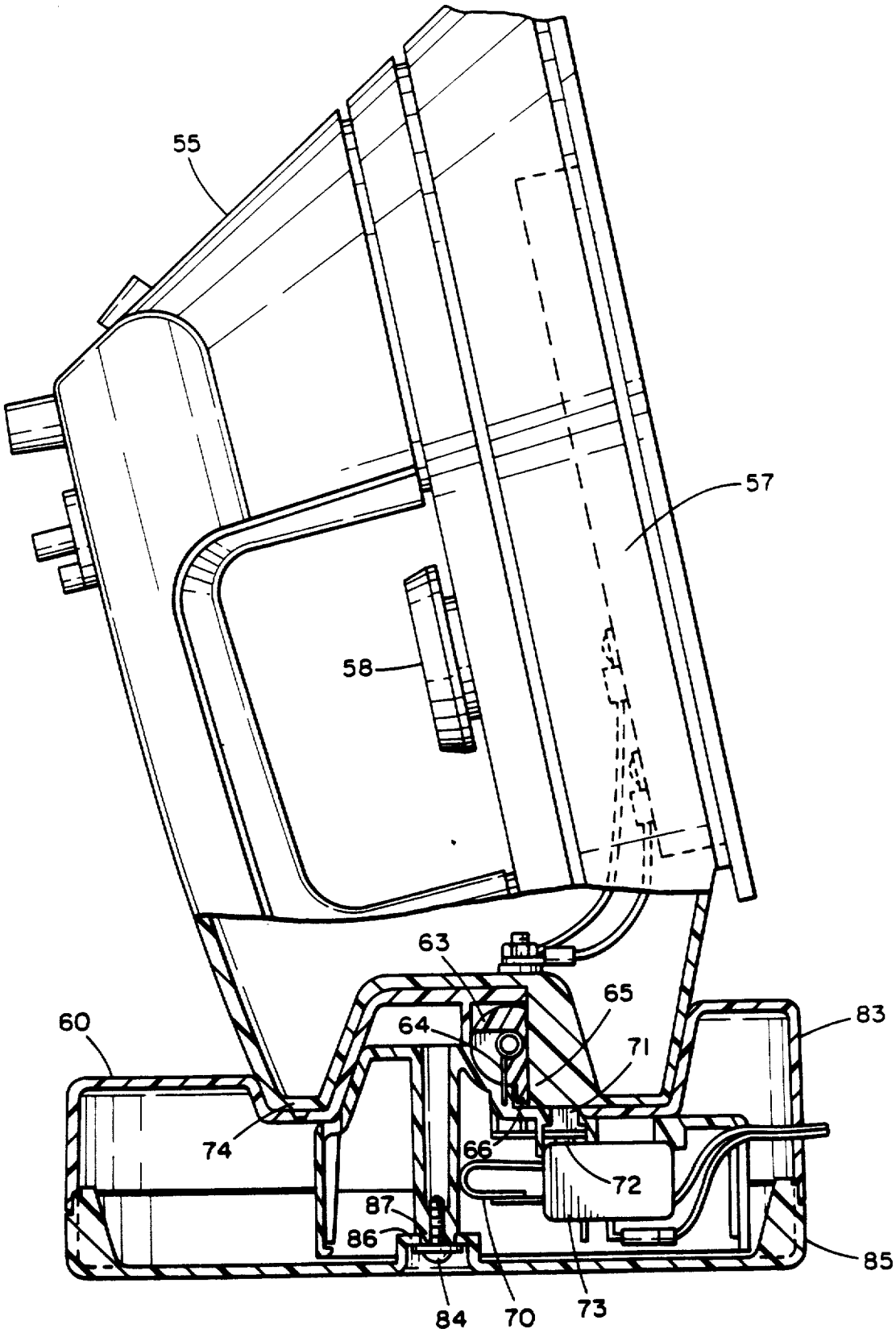
FIG. 15 is a partial side cross-section view of the iron and base of FIG. 14, taken along plane 15—15.

Another embodiment of this invention is shown in FIGS. 13–15. Those figures show a cordless iron which incorporates the electrical connector of this invention. Iron 55 incorporates plug 56 electrically connected to iron heating element 57. Iron control 58 operates conventionally to modulate heat produced by heating element 57. Plug 56 is adapted to be received by socket 59 carried by iron support 60, to support iron 55 when it is not in use, and to provide electrical power to iron 55. Socket 59 is connected to cord 61 and cord plug 62, by which socket 59 can be electrically connected to a power supply. Socket 59 comprises baffle 63, in the shape described above with respect to baffle 5. Baffle 63 is biased closed by coil spring 64 when plug 56 is not in engagement with socket 59. Projection 65 carried by plug 56 cooperates with baffle control arm 66 to open baffle 63 when plug 56 engages socket 59, exposing socket contacts 67 to plug prongs 68. As iron 55 is placed on support 60, plug 56 engages socket 59. Plug prongs 68 enter apertures 69 in socket 59, and projection 65 engages baffle control arm 66. As iron 55 is lowered into place on support 60, projection 65 cooperates with baffle control arm 66 to open baffle 63, and plug prongs 68 engage socket contacts 67. Socket contacts 67, incorporating springs 70, are deflected slightly downward by the weight of iron 55, allowing projection 65 to engage slide 71 which in turn engages button 72 of switch 73. Switch 73 is electrically connected between cord 61 and one of socket contacts 67. When switch 73 is turned on by depressing button 72, electrical power can be provided to socket contacts 67 via cord plug 62 and cord 61. Skirt 74 shields socket contacts 67 from user access when baffle 63 is in its open position as iron 55 is being lowered into place on support 60 and as it is being lifted from support 60.

Another feature of the cordless iron of this invention is rotary table 83 incorporated into support 60. Screw 84 holds table 83 and platform 85 together, and provides and axis about which table 83 can rotate. Table 83 is supported proximate screw 84 by ledge 86, which slides against edge 87 when table 83 is rotated on platform 85.

As is apparent from the above description, many other embodiments and features of this invention are included within the intent and scope of this invention as defined by the appended claims.

I claim:

1. A plug and socket electrical connector, comprising:

(a) a plug having an electrically conductive plug prong, (b) a socket engagable with said plug, having a passage comprising one or more apertures and an electrically conductive socket contact proximate said passage, said passage adapted to receive at least a portion of said plug prong in a position of engagement with said socket contact, (c) means for establishing electrical union between said socket contact and a power supply, (d) a movable baffle [rotatably] supported by said socket, *rotatable about an axis generally transverse to said passage*, having a shield movable to a closed position intermediate said passage and said socket contact and movable to an open position in which said socket contact is exposed to said passage, (e) a baffle control arm rotatably supported by said socket and cooperative with said baffle, movable to a first position corresponding to said closed position of said shield, and having an engagement surface separate from said shield engagable to move said baffle control arm from said first position to a second position corresponding to said open position of said shield, (f) means for moving said shield from said open position to said closed position when said baffle control arm is disengaged, (g) means for moving said baffle control arm from said second position to said first position when said baffle control arm is disengaged, and (h) a projection carried by said plug separate from said plug prong in a position of alignment with said engagement surface when said plug prong is in alignment with said passage, *said projection* adapted to engage said engagement surface and to move said baffle control arm from said first position to said second position as said plug prong is moved from said position of alignment toward said position of engagement with said socket contact, whereby said shield is moved to said open position and said socket contact is exposed to said plug prong for engagement to establish an electrical connection between said socket and said plug.

[2. The electrical connector of claim 1, wherein said baffle pivots about an axis generally parallel to the direction of movement of said plug prong through said passage, and wherein said baffle moves in a direction generally transverse to said direction of movement of said plug prong.]

3. The electrical connector of claim 1, wherein when said plug and said socket are out of engagement and said plug prong is in alignment with said passage and said projection is in alignment with said engagement surface, the distance between said plug prong and said passage is less than the distance between said projection and said engagement surface, such that as said plug prong is moved toward said passage in alignment therewith, said projection engages said baffle control arm after said passage receives said plug prong.

4. The electrical connector of claim 1, wherein said baffle comprises a generally cylindrical rotor which pivots about an axis generally transverse to said direction of movement of said plug prong from said position of alignment to said position of engagement.

5. The electrical connector of claim 4, wherein said [menas] *means* for establishing electrical union between said socket contact and a power supply comprises an electric switch between said socket contact and said power supply, means for biasing said switch open, and means for closing said switch when said plug is engaged with said socket.

6. The electrical connector of claim 5, wherein said means for closing said switch comprises a leg carried by said plug and a switch control carried by said switch which cooperate to close said switch as said plug is engaged with said socket.

7. The electrical connector of claim 6, wherein said leg comprises said projection.

8. The electrical connector of claim 7, wherein said position of engagement comprises a first position in which said switch is open, and a second position in which said switch is closed, whereby as said plug and said socket are engaged, said plug prong engages said socket contact before said switch is closed.

9. The electrical connector of claim 8, wherein said socket contact yieldably engages said plug prong between a first position in which said switch is open and a second position in which said switch is closed, said first position, said second position, and said position of alignment being along a generally straight line.

10. The electrical connector of claim 1, wherein said baffle pivots about an axis generally transverse to said direction of movement of said plug prong through said passage, and wherein said baffle moves in a direction at an angle greater than about 45 degrees from said direction of movement of said plug prong.

11. The electrical connector of claim 10, wherein said direction of movement of said shield is generally transverse to said direction of movement of said plug prong.

12. The electrical connector of claim 11, wherein said baffle and said baffle control arm comprise a unitary structure, and said baffle control arm is offset from said axis.

13. The electrical connector of claim 12, wherein said means for moving said shield and said means for moving said baffle control arm comprise a spring.

14. The electrical connector of claim 13, wherein said baffle has a contact cut-out which receives said socket contact when said baffle is in said closed position and through which said plug prong projects when said plug prong is in said position of engagement with said socket contact.

15. The electrical connector of claim 14, wherein said socket carries a wall between said engagement surface and said socket contact.

16. The electrical connector of claim 15, wherein said wall comprises a baffle cut-out separate from said socket cut-out and adjacent to said engagement surface.

17. The electrical connector of claim 16, wherein said wall comprises a surface defining an opening separate from said passage proximate said baffle control arm, adapted to receive at least a portion of said projection in a position of engagement with said baffle control arm.

18. The electrical connector of claim 17, wherein said baffle comprises a generally cylindrical rotor having a longitudinal axis about which it rotates.

19. An electrical connector comprising:

(a) a plug having a plug prong and a socket having a passage adapted to receive said plug prong and a socket contact aligned with said passage arranged to electrically engage said plug prong, said plug prong being locatable in a first, a second, and a third position of alignment with said passage, said position being progressively more proximate said socket contact, and a fourth position of engagement with said socket contact, (b) a shield rotatably carried by said socket, *having an axis generally transverse to said passage*, said shield movable to a closed position in alignment between said passage and said socket contact and movable to an open position out of alignment between said passage and said socket contact, (c) a shield control arm rotatably supported by said socket operative on said shield, located at a position offset from said shield, movable to an initial position corresponding to said closed position and to a final position corresponding to said open position, (d) a projection carried by said plug at a location offset from said plug prong in alignment with said shield control arm when said plug prong is in said first position, *said projection* in engagement with said shield control arm when said shield control arm is in said initial position and said plug prong is in said second position, and in engagement with said shield control arm when said shield control arm is in said final position and said plug prong is in said third position, and (e) means to move said shield to said closed position when said projection is not in engagement with said shield control arm, whereby as said plug is engaged with said socket and said plug prong is moved toward said socket contact, said projection moves said shield to said open position exposing said socket contact to said plug prong to allow engagement of said plug prong with said socket contact.

20. The electrical connector of claim 19, wherein said plug comprises a wall surrounded by a skirt defining a recess, said plug prong located on said wall and extending into said recess, said socket comprising a raised portion having a top surface in which said passage is located, the external dimensions of said raised portion generally corresponding to the internal dimensions of said recess, and the location of said plug prong on said wall generally corresponding to the location of said passage in said top surface, such that said recess and said raised portion are generally engagable in mating relationship.

21. The electrical connector of claim 19, wherein said socket comprises a wall surrounded by a skirt defining a recess, said passage located in said wall, said plug comprising a raised portion having a top surface carrying said plug prong, the external dimensions of said raised portion generally corresponding to the internal dimensions of said recess, and the location of said plug prong on said top surface generally corresponding to the location of said passage in said wall, such that said recess and said raised portion are generally engagable in mating relationship.

22. The electrical connector of claim 19, wherein said shield comprises a rotor having an axis of rotation generally transverse to the direction of movement of said plug prong between said second position and said third position, said shield having a cut-out which receives said socket contact when said shield is in said closed position and through which said plug prong projects when said plug prong is in said fourth position.

23. The electrical connector of claim 22, wherein said socket contacts are connected to a power supply through a switch biased open, said switch having a switch control aligned with said projection when said plug prong is in said fourth position, said socket contact being yieldable to allow said plug prong to move to a fifth position in engagement with said socket contact wherein said projection is in engagement with said switch control.

*24. The electrical connector of claim 1, wherein said baffle control arm rotates about said axis.*

* * * * *